US010853126B2

(12) United States Patent
Tarasuk-Levin et al.

(10) Patent No.: US 10,853,126 B2
(45) Date of Patent: Dec. 1, 2020

(54) REPROGRAMMING NETWORK INFRASTRUCTURE IN RESPONSE TO VM MOBILITY

(71) Applicant: VMware, Inc., Palo Alto, CA (US)

(72) Inventors: Gabriel Tarasuk-Levin, San Jose, CA (US); Chi-Hsiang Su, Santa Clara, CA (US); Christoph Klee, Snoqualmie, WA (US); Robert Bosch, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 150 days.

(21) Appl. No.: 16/046,585

(22) Filed: Jul. 26, 2018

(65) Prior Publication Data

US 2020/0034191 A1 Jan. 30, 2020

(51) Int. Cl.
*G06F 9/455* (2018.01)
*G06F 9/48* (2006.01)
*H04L 29/12* (2006.01)

(52) U.S. Cl.
CPC ........ *G06F 9/4856* (2013.01); *G06F 9/45558* (2013.01); *H04L 61/2007* (2013.01); *G06F 2009/4557* (2013.01); *G06F 2009/45595* (2013.01)

(58) Field of Classification Search
CPC .................................................. G06F 9/45533
USPC ........................................................... 718/1
See application file for complete search history.

(56) References Cited

U.S. PATENT DOCUMENTS

| | | | | |
|---|---|---|---|---|
| 9,870,324 B2* | 1/2018 | Mattson, Jr. | .......... | G06F 12/145 |
| 2008/0043756 A1* | 2/2008 | Droux | ..................... | H04L 12/66 |
| | | | | 370/399 |
| 2009/0150527 A1* | 6/2009 | Tripathi | ................ | H04L 45/586 |
| | | | | 709/221 |
| 2009/0150529 A1* | 6/2009 | Tripathi | ................ | G06F 9/455 |
| | | | | 709/222 |
| 2009/0150547 A1* | 6/2009 | Tripathi | ................ | G06F 15/173 |
| | | | | 709/226 |
| 2009/0219935 A1* | 9/2009 | Tripathi | ............. | H04L 12/4641 |
| | | | | 370/392 |
| 2009/0219936 A1* | 9/2009 | Tripathi | ................ | H04L 41/00 |
| | | | | 370/392 |
| 2009/0222567 A1* | 9/2009 | Tripathi | ............ | H04L 29/08846 |
| | | | | 709/230 |
| 2009/0238189 A1* | 9/2009 | Tripathi | ................ | H04L 45/00 |
| | | | | 370/395.32 |
| 2009/0327781 A1* | 12/2009 | Tripathi | ............... | G06F 9/5077 |
| | | | | 713/324 |
| 2011/0022694 A1* | 1/2011 | Dalal | ..................... | H04L 47/783 |
| | | | | 709/222 |
| 2011/0090915 A1* | 4/2011 | Droux | ..................... | H04L 49/00 |
| | | | | 370/411 |
| 2012/0030674 A1* | 2/2012 | Mundkur | ........... | G06F 13/4022 |
| | | | | 718/1 |

(Continued)

*Primary Examiner* — Mehran Kamran
(74) *Attorney, Agent, or Firm* — Patterson + Sheridan LLP

(57) ABSTRACT

The disclosure provides an approach for dynamically reprogramming network and network infrastructure in response to VM mobility. The approach provides a hypervisor layer that can observe changes in VM-host relationships and reprogram the associated network and network infrastructure to maintain network communication. The hypervisor layer notifies an elastic network interface of a new IP address to include within its whitelist in response to VM migration to that elastic network interface.

20 Claims, 2 Drawing Sheets

(56) References Cited

U.S. PATENT DOCUMENTS

| | | | |
|---|---|---|---|
| 2012/0131662 A1* | 5/2012 | Kuik | G06F 9/45558 726/11 |
| 2012/0185914 A1* | 7/2012 | Delco | G06F 9/45558 726/1 |
| 2012/0192182 A1 | 7/2012 | Hayward et al. | |
| 2013/0031294 A1* | 1/2013 | Feng | G06F 9/06 711/6 |
| 2013/0086583 A1* | 4/2013 | Uemura | G06F 9/4401 718/1 |
| 2013/0205106 A1* | 8/2013 | Tati | G06F 3/061 711/159 |
| 2014/0013324 A1* | 1/2014 | Zhang | H04L 49/70 718/1 |
| 2014/0207926 A1* | 7/2014 | Benny | H04L 41/0213 709/223 |
| 2015/0121372 A1* | 4/2015 | Hatta | G06F 9/54 718/1 |
| 2015/0134822 A1* | 5/2015 | Bhagwat | H04L 41/0803 709/226 |
| 2015/0149813 A1* | 5/2015 | Mizuno | G06F 11/1438 714/4.11 |
| 2016/0261496 A1* | 9/2016 | Chang | H04L 12/4633 |
| 2017/0054686 A1* | 2/2017 | Malkov | G06F 9/45558 |
| 2017/0244673 A1* | 8/2017 | Han | H04L 63/0263 |
| 2018/0006878 A1* | 1/2018 | Raman | G06F 11/3433 |
| 2018/0152417 A1* | 5/2018 | Jain | H04L 63/0263 |
| 2018/0212875 A1* | 7/2018 | Zhu | H04L 47/22 |
| 2018/0262396 A1* | 9/2018 | Wang | H04L 41/0816 |
| 2019/0036969 A1 | 1/2019 | Chandrashekhar et al. | |
| 2019/0182207 A1* | 6/2019 | Tsirkin | G06F 9/45558 |
| 2020/0084179 A1* | 3/2020 | Bansal | H04L 61/2507 |

* cited by examiner

REPROGRAMMING NETWORK INFRASTRUCTURE IN RESPONSE TO VM MOBILITY

BACKGROUND

Data centers, such as cloud data centers, have a need to abstract physical constructs, such as network interface cards (NICs). The abstraction of NICs into virtual NICs (vNICs) helps administrators manage network connections without having to directly work with the physical hardware itself. In the cloud data center context, a vNIC is sometimes referred to as an elastic network interface (ENI). An ENI is a software-based virtual network interface that can be implemented within a host. An ENI can function similarly to a network interface card (NIC) in that an ENI may be addressable, such as through an Internet Protocol (IP) address, and may function as a gateway to a host computer. A host computer may have several ENIs. An ENI may be associated with the physical NIC of a host, and may act in conjunction with the physical NIC. Although this document discusses ENIs, the teachings herein apply equally to any abstraction for managing network interfaces.

Data centers often utilize virtual machines (VMs) that run within host computers. Deployment of VMs within hosts allows an efficient use of the host's resources, such as central processing unit (CPU) cycles, memory, etc. An ENI may include security functionality that filters packets in and out of the host computer. For example, in addition to an ENI's primary IP address, an ENI may have a list of secondary IP addresses associated with the ENI. The list of secondary IP addresses may function as a "whitelist" of addresses for the host, and the whitelist may include IP addresses of VMs running on the host of the ENI.

For example, one way that an ENI may function is to allow passage of incoming packets with a destination address of a VM located on the host of the ENI, if the address of the VM is a secondary address of the ENI. But the ENI may block a packet with a destination address of a VM that is not located on that host, if the address of the VM is not a secondary address of the ENI. Similarly, the ENI may let pass outgoing packets with a source address of a VM located on the host of the ENI, but the ENI may block a packet with a source address of a VM that is not located on the host of the ENI.

The security layer of an ENI works to ensure that misaddressed packets do not enter or exit a host computer. However, the same security layer creates complications when VMs are migrated from host to host. Migrating a VM to another host creates inaccuracies in the whitelists of ENIs, because after a VM migration, a whitelist may not include all VMs on the host of that ENI, or a whitelist may include VMs that are no longer on the host of that ENI. Inaccurate whitelists may cause a VM to be unreachable within its host, and may cause a VM's packets to be unable to exit the host.

SUMMARY

Embodiments provide a method of dynamically reprogramming network infrastructure, the method comprising providing a virtual machine (VM) on a first host, migrating the VM from the first host to a second host, connecting the VM to a second hypervisor on the second host, and associating the VM with a second elastic network interface (ENI) of the second host. The method further comprises, responsive to the connecting, extracting an identifier of the VM and an identifier of the second ENI, transmitting the identifier of the VM and the identifier of the second ENI to a controller, and adding, by the controller, the identifier of the VM to a second list associated with the second ENI. The method further comprises receiving, by the second ENI, a network packet, comparing, by the second ENI, the destination address of the packet to the second list, and responsive to the comparing, blocking the packet, by the second ENI, if the destination or source address is not on the second list.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides an approach for dynamically reprogramming network infrastructure in response to VM mobility. The approach includes a hypervisor layer, i.e. a daemon, that listens for modification to VM-host associations and reprograms the associated network infrastructure to maintain network communication. The hypervisor layer notifies an ENI of a new IP address to include within the ENI's whitelist, as a secondary IP address, in response to VM migration to that ENI's host computer. As used herein, the term "network infrastructure" includes components of data center 102 (see FIG. 1).

Figure 1:
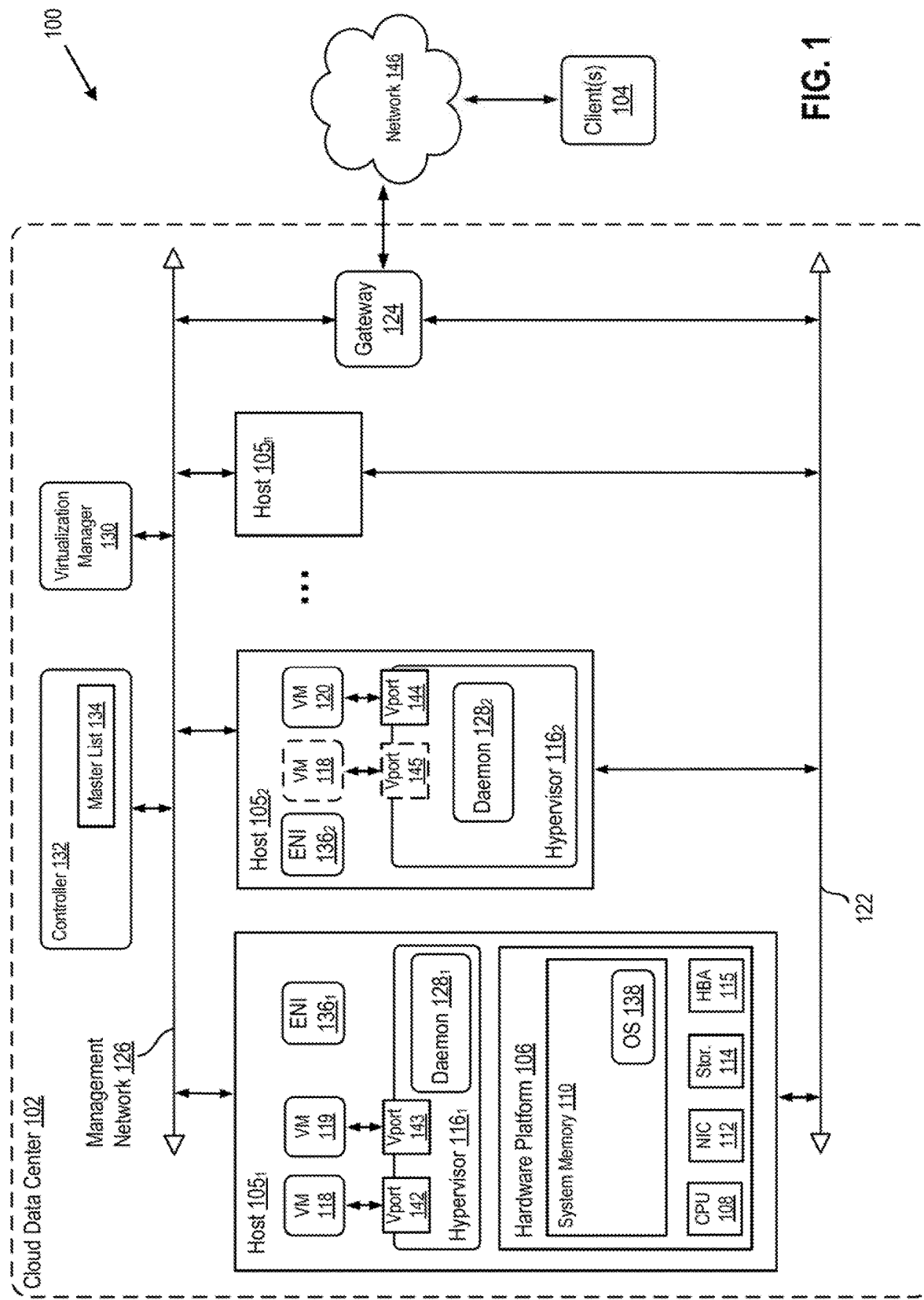
FIG. 1 depicts a block diagram of a computer system in which one or more embodiments of the present disclosure may be utilized.

FIG. 1 depicts a block diagram of a computer system 100 in which one or more embodiments of the present disclosure may be utilized. Computer system 100 includes cloud data center 102 connected to one or more client(s) 104 by a network 146. Client 104 may be within its own data center (not shown) or may be a standalone device, such as a desktop or a mobile computer. In an embodiment, client 104 issues commands to cloud data center 102 through virtualization manager 130, and virtualization manager then translates the commands to an application programming interface (API) of controller 132, and issues the commands to controller 132 using the API. In another embodiment, client 104 issues commands to cloud data center 102 by directly communicating with controller 132, bypassing virtualization manager 130. Network 146 may be, for example, a direct link, a local area network (LAN), a wide area network (WAN) such as the Internet, another type of network, or a combination of these.

Cloud data center 102 may be a private cloud that serves a single tenant, a public cloud that serves multiple tenants, or a hybrid cloud. As used herein, an internal cloud or "private" cloud is a cloud in which a tenant and a cloud service provider are part of the same organization, while an external or "public" cloud is a cloud that is provided by an organization that is separate from a tenant that accesses the external cloud. A hybrid cloud is a cloud architecture in which a tenant is provided with seamless access to both private cloud resources and public cloud resources. In an embodiment, cloud data center 102 may implement Amazon Web Services (AWS), which is a suite of remote compute services provided by Amazon.com, Inc.

Cloud data center 102 includes host(s) 105, a virtualization manager 130, a controller 132, a gateway 124, a management network 126, and a data network 122. Each of hosts 105 may be constructed on a server grade hardware platform 106, such as an x86 architecture platform. For example, hosts 105 may be geographically co-located servers on the same rack. Each host 105 shown in FIG. 1 may be substantially the same, containing substantially the same components. Hosts $105_2$ and $105_n$ are simplified depictions of a host 105, but may contain the same or similar components at host $105_1$. Host $105_2$ is shown as containing VM 118, with VM 118 depicted in dashed lines. The dashed lines indicate that VM 118 is in the process of being migrated from host $105_1$ to host $105_2$, as further discussed with reference to FIG. 2, below.

Host 105 is configured to provide a virtualization layer, also referred to as a hypervisor 116, that abstracts processor, memory, storage, and networking resources of hardware platform 106 into multiple virtual machines, e.g., VMs 118 and 119 on host $105_1$ and VM 120 on host $105_2$. VMs on the same host 105 may run concurrently. Each of VMs 118-120 connect to hypervisor 116 through virtual ports (vports) 142-144. Each of vports 142-144 provides connectivity between a VM and hypervisor 116. A vport may be created within hypervisor 116 for a VM when the VM is first created on host 105 or when the VM is first migrated to a host 105 from another host 105. Each vport 142-144 may be associated with a particular ENI of host 105. Hypervisor 116 may run on top of operating system (OS) 138 in host 105 or directly on hardware platform 106 of host 105. One example of a hypervisor 116 that may be used is a VMware ESXi™ hypervisor provided as part of the VMware vSphere® solution made commercially available from VMware, Inc. of Palo Alto, Calif.

Hypervisor 116 includes daemon 128. Daemon 128 is a software module that monitors port-connect events. A port-connect occurs when a VM connects to a port of hypervisor 116, such as when VM 118 connects to vport 142. Port-connect events are kernel-level events. Daemon 128 plugs into the code path of port-connects and listens for the occurrence of port-connect events. Upon the occurrence of a port-connect, daemon 128 extracts the IP address of the VM of the port-connect between that VM and hypervisor 116. Daemon also extracts the IP address of ENI 136, such as the primary IP address, that is associated with the port-connect. Upon extracting the IP address of the VM and the ENI, daemon 128 sends to controller 132 the IP address of the VM, along with the primary IP address of ENI 136 of the port-connect. Upon receiving the ENI and VM IP addresses, controller 132 updates master list 134 so as to add the IP address of the received VM as a secondary address associated with the received ENI IP address. Optionally, controller 132 then transmits its updated master list 134, or relevant portions thereof, to some or all ENIs 136 of cloud data center 102.

Host 105 includes one or more ENIs 136. ENI 136 is a software-based virtual network interface similar to a virtual NIC. ENI 136 has an IP address that designates ENI 136, and this IP address may be referred to as a "primary" IP address of that ENI 136. ENI 136 may be a virtual appliance (e.g., a VM), a software module running within system memory 110, or a component of hypervisor 116. In an embodiment, ENI 136 is the virtual NIC of a virtual router (not shown) of host 105.

Each VM on host 105 is associated with an ENI 136 on that host 105. For example, on host $105_1$, VM 118 and/or vport 142 may be associated with ENI $136_1$. ENI 136 includes security functionality that filters incoming and outgoing VM packets. ENI 136 has a whitelist of secondary IP addresses, and that list includes IP addresses of VMs associated with that ENI. Following from the previous example, ENI $136_1$ may have a whitelist that includes IP address of VM 118 and VM 119.

An outgoing packet sent by a source VM (e.g., VM 118) reaches source ENI 136 (e.g., ENI $136_1$), which acts as a virtual NIC. ENI $136_1$ then checks the source IP address, and if the source IP address (i.e., IP address of source VM) is whitelisted as a secondary address on source ENI 136 of source host 105, then ENI 136 allows the outgoing packet to leave source host 105. The packet is then transmitted or routed to the next hop on the path to the packet's destination IP. Otherwise, if the source IP address is not whitelisted as a secondary address on source ENI 136, then source ENI $136_1$ blocks the outgoing packet from leaving source host 105. In this embodiment, ENI $136_1$ knows the whitelists of other ENIs 136, or ENI $136_1$ can access whitelists of other ENIs 136 by querying other ENIs 136 or by querying control 132. In an embodiment, ENI $136_1$ does not directly block or allow passage of a packet, but acts in conjunction with another component of computer system 100, such as a switch (e.g., virtual switch within hypervisor 116) to block or allow passage of a packet.

In an embodiment, an outgoing packet's destination IP is checked by source ENI 136, i.e., by ENI 136 of host 105 on which source VM is located. An outgoing packet sent by a source VM (e.g., VM 118) reaches source ENI 136 (e.g., ENI $136_1$), which acts as a virtual NIC. ENI $136_1$ then checks the destination IP address, and if the source IP address (i.e., IP address of source VM) is whitelisted as a secondary address on destination ENI 136 (e.g., ENI $136_2$) of destination host 105, then ENI 136 allows the outgoing packet to leave source host 105. The packet is transmitted or routed out of source host 105 to the next hop on the path to the packet's destination IP. Otherwise, if the source IP address is not whitelisted as a secondary address on destination ENI 136, then source ENI $136_1$ blocks the outgoing packet from leaving source host 105. In this embodiment, ENI $136_1$ knows the whitelists of other ENIs 136, or ENI $136_1$ can access whitelists of other ENIs 136 by querying other ENIs 136 or by querying controller 132.

In a second embodiment, a packet's destination IP address is checked by destination ENI 136 when the packet reaches destination host 105 of destination ENI 136. In cloud data center 102, each packet that reaches physical NIC 112 of one of hosts 105 is transmitted to ENI 136 of that host 105. ENI 136 compares the packet's destination IP address to the whitelist (list of secondary IP addresses) of ENI 136, and if the destination IP address is not on the whitelist, then then packet is blocked. Otherwise, the packets is transmitted or routed toward its destination IP.

In a third embodiment, network packets the flow through cloud data center 102 pass through controller 132. Controller 132 then checks each packet's source IP address, destination IP address, or both. Controller 132 compares the packet's source IP address to ensure that a VM with that address is located on source host 105 from which the packet originated. Controller 132 ensures this by comparing the packet's source IP address to the whitelist (list of secondary addresses) of source ENI 136 of source host 105, and ensuring that the packet's source IP address is listed as a secondary IP address of source ENI 136. Controller 132 also compares the packet's source IP address to the whitelist of destination ENI 136, to ensure that the packet's source IP address is listed as a secondary IP address of destination ENI 136, and to ensure that destination host 105 is allowed to receive packets from source IP address (i.e., source VM). Controller 132 compares the packet's destination IP address to the whitelist of destination ENI 136 of destination host 105 to ensure that the packet's destination IP address is listed on destination ENI's whitelist as a secondary IP address.

Hardware platform 106 of each host 105 may include components of a computing device such as one or more processors (CPUs) 108, system memory 110, a network interface 112, storage system 114, a local host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs). Storage system 114 represents local persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 includes OS 138, which is the operating system of host 105. System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with controller 132 and with client 104 via management network 126. Virtualization manager 130 issues commands to controller 132 through an API of controller 132. In an embodiment, virtualization manager 130 is optional and controller 132 performs the functionality of virtualization manager 130. Virtualization manager may be a tenant-specific software for managing virtual machines, and virtualization manager 130 uses software native to public cloud data center 102 (i.e., controller 132) to manage cloud data center 102.

Virtualization manager 130 communicates with hosts 105 via a network, shown as a management network 126, and carries out administrative tasks for data center 102 such as communicating with controller 132 for managing hosts 105, managing local VMs 118-120 running within host 105, provisioning VMs, migrating VMs from one host to another host, and load balancing between hosts 105. Virtualization manager 130 may be a computer program that resides and executes in a central server in cloud data center 102 or, alternatively, virtualization manager 130 may run as a virtual appliance (e.g., a VM) in one of hosts 105. One example of a virtualization manager 130 is the vCenter Server™ product made available from VMware, Inc.

Controller 132 communicates with hosts 105 via a network, shown as a management network 126, and carries out commands issued by virtualization manager 130. In an embodiment in which no virtualization manager is present, controller 132 may perform tasks substantially similar to virtualization manager 130. As described above, controller 132 receives from daemon 128 updates of ENI-VM associations. That is, upon the occurrence of a port-connect, daemon 128 extracts the IP address of the VM of the port-connect and the IP address of the ENI 136 associated with the port-connect. Daemon 128 sends to controller 132 the IP address of the VM and the ENI 136. Upon receiving the ENI 136 and VM IP addresses, controller 132 updates master list 134 with the new association between ENI 136 and VM IP addresses. That is, controller 132 associates IP address of the VM as a secondary IP address of the ENI 136 by placing the IP address of the VM on the whitelist of that ENI 136. Optionally, controller 132 then transmits its updated master list 134, or portions thereof, to some or all ENIs 136 of cloud data center 102. Controller 132 may be a virtual appliance, a physical device, or a software module running within host 105. Controller 132 may be a virtual appliance such as one of VMs 120 or a distributed service running on one or more virtual appliance, such as on one or more VMs 120. One example of a controller 132 is the Amazon® Elastic Compute Cloud (EC2™) product made available from Amazon.com, Inc.

Gateway 124 provides VMs 118-120 and other components in data center 102 with connectivity to network 146. Gateway 124 may manage external public IP addresses for VMs 118-120 and route traffic incoming to and outgoing from cloud data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105. Gateway 124 may include two gateways: a management gateway for management network 126 and a data gateway for data network 122.

Figure 2:
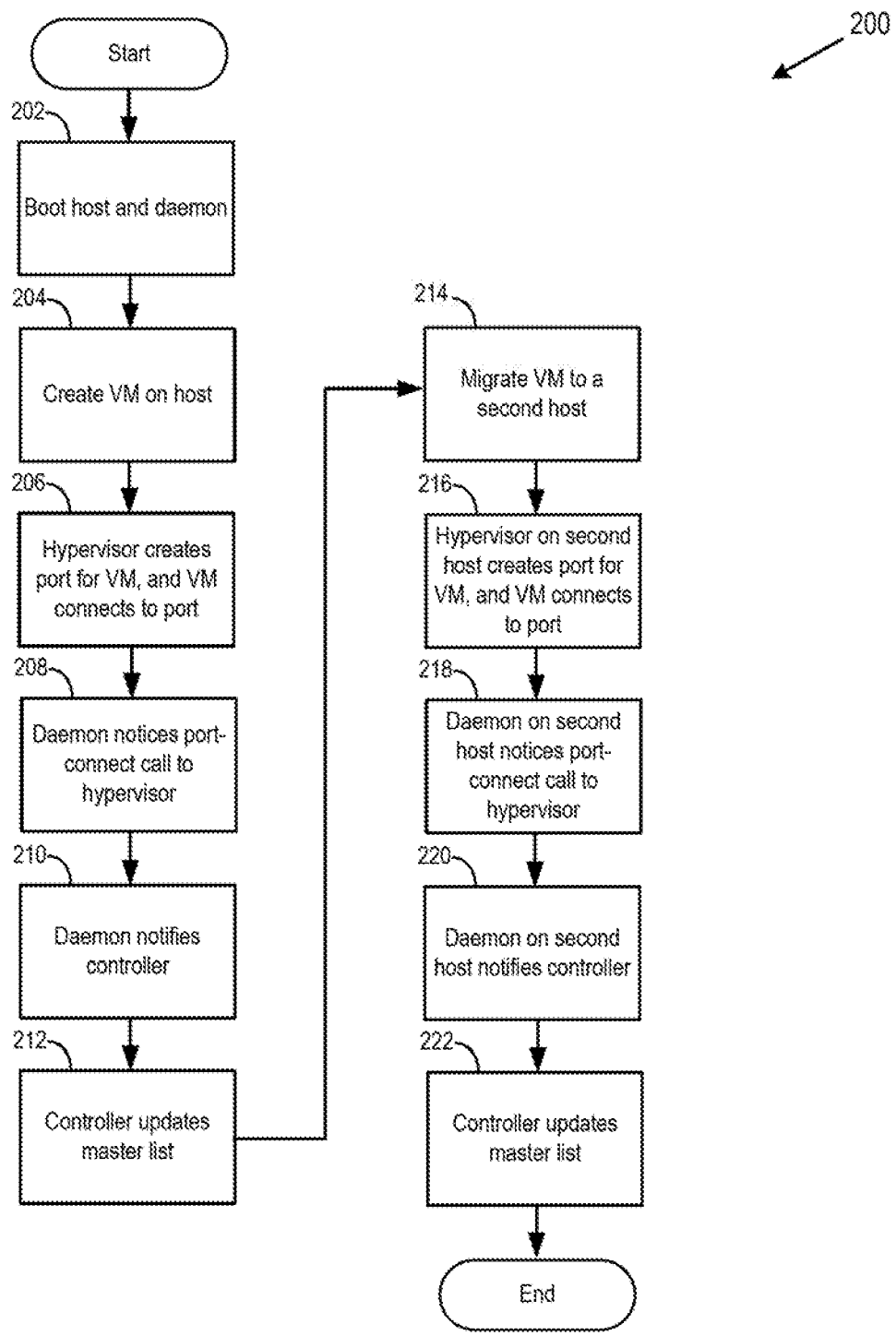
FIG. 2 depicts a flow diagram of a method of creating and migrating a VM from one host to another host, according to an embodiment.

FIG. 2 depicts a flow diagram of a method of creating and migrating a VM from one host to another host, according to an embodiment. In describing method 200, migration of VM 118 from host 105$_1$ to host 105$_2$ will be used for illustration purposes. However, the same principles may apply to any VM in cloud data center 102.

At step 202, host 105$_1$ is booted up, which also boots hypervisor 116$_1$ and daemon 128$_1$. At step 204, VM 118 is created on host 105$_1$. VM 118 may be created by a command issued by client 104 to virtualization manager 130, that command being translated into API of controller 132 and forwarded to controller 132. VM 118 may be created by a direct command from client 104 to controller 132. VM 118 may also be created automatically upon satisfaction of certain conditions, those conditions being evaluated by controller 132, virtualization manager 130, or another module.

At step 206, hypervisor 116$_1$ creates a new virtual port 142 for the newly created VM 118. Hypervisor 116$_1$ associates vport 142 with ENI 136$_1$ so that packets sent to VM 118 always flow through ENI 136$_1$ before reaching VM 118, and so that packets sent from VM 118 always flow through ENI 136₁ before being transmitted to the packet's destination address. By associating vport 142 with ENI 136₁, hypervisor 116₁ also associates VM 118 with ENI 136₁. As part of step 206, VM 118 connects to hypervisor 116₁ through vport 142.

At step 208, daemon 128₁ detects the port-connect event of step 206 between hypervisor vport 142 and VM 118. Daemon 128₁ extracts the IP address of VM 118 and the primary IP address of ENI 136₁.

At step 210, daemon 128₁ sends IP address of VM 118 and the primary IP address of ENI 136₁ to controller 132. Optionally, daemon 128₁ also sends IP address of VM 118 to ENI 136₁ so that ENI 136₁ may update its local separately-maintained whitelist (not shown).

At step 212, controller 132 updates master list 134 to add IP address of VM 118 as a secondary address of ENI 136₁. Addition of IP address of VM 118 as secondary address of ENI 136₁ effectively places VM 118 onto the whitelist of ENI 136₁. In an embodiment, when a packet flows through ENI 136₁, ENI 136₁ may query controller 132 as to whether the packet's source and/or destination IP address—in an embodiment, depending on whether packet is outgoing or incoming—is on the whitelist (listed as secondary IP address) of ENI 136₁.

In another embodiment, controller 132 sends a command to ENI 136₁ to update a local whitelist (not shown) maintained by ENI 136₁ so that ENI 136₁ would not need to query controller 132 when packets flow through ENI 136₁. In a third embodiment, when daemon 128₁ sends IP address of VM 118 and the primary IP address of ENI 136₁ to controller 132, daemon 128₁ also sends IP address of VM 118 to ENI 136₁ for ENI 136₁ to update its own separately-maintained whitelist (not shown).

At step 214, VM 118 is migrated from host 105₁ to host 105₂. The migration process is depicted in FIG. 1 by the dashed lines around VM 118 within host 105₂. The migration process may be prompted by a command issued by client 104 to virtualization manager 130, that command being translated into API of controller 132 and forwarded to controller 132. Migration of VM 118 may be initiated by a direct command from client 104 to controller 132. Migration of VM 118 may also be initiated automatically upon satisfaction of certain conditions, those conditions being evaluated by controller 132, virtualization manager 130, or another module. VM 118 may be migrated by VM migration methods known in the art, such as the method described in U.S. patent application Ser. No. 13/760,868, filed Feb. 6, 2013, or the method described in U.S. Pat. No. 9,870,324, issued Jan. 16, 2018. The entire contents of both of these documents are incorporated by reference herein.

After completion of migration of VM 118, hypervisor 116₁ may unreserve memory of VM 118 on host 105₁, may disconnect VM 118 from vport 142, and may delete or unreserve vport 142.

At step 216, hypervisor 116₂ creates a new vport 145 for the newly migrated VM 118. Hypervisor 116₂ associates vport 145 with ENI 136₁ so that packets sent to VM 118 always flow through ENI 136₂ before reaching VM 118, and so that packets sent from VM 118 always flow through ENI 136₂ before being transmitted to the packet's destination address. By associating vport 145 with ENI 136₂, hypervisor 116₂ also associates VM 118 with ENI 136₂. As part of step 216, VM 118 connects to hypervisor 116₂ through vport 145.

At step 218, daemon 128₂ notices the port-connect event of step 216 between hypervisor vport 145 and VM 118. Daemon 128₂ extracts the IP address of VM 118 and the primary IP address of ENI 136₂.

At step 220, daemon 128₂ sends IP address of VM 118 and the primary IP address of ENI 136₂ to controller 132. Optionally, daemon 128₂ also sends IP address of VM 118 to ENI 136₂ for ENI 136₂ to update its local separately-maintained whitelist (not shown).

At step 222, controller 132 updates master list 134 to add IP address of VM 118 as a secondary address of ENI 136₂. As part of adding IP address of VM 118 as a secondary address of ENI 136₂, controller 132 also removes IP address of VM 118 as secondary IP address of ENI 136₁. Addition of IP address of VM 118 as secondary address of ENI 136₁ places VM 118 onto the whitelist of ENI 136₂.

In an embodiment, when a packet flows through ENI 136₂, ENI 136₂ may query controller 132 as to whether the packet's source or destination IP address—depending on whether packet is outgoing or incoming, respectively—is on the whitelist (listed as secondary IP address) of ENI 136₂. In a second embodiment, controller 132 sends a command to ENI 136₂ to update a local whitelist (not shown) maintained by ENI 136₂ so that ENI 136₂ does not need to query controller 132 when packets flow through ENI 136₂. In this second embodiment, ENI 136₂ updates its local whitelist to remove an association between ENI 136₁ and VM 118 when receiving an updated association of VM 118 with ENI 136₂. In a third embodiment, when daemon 128₂ sends IP address of VM 118 and the primary IP address of ENI 136₂ to controller 132, daemon 128₂ also sends IP address of VM 118 to ENI 136₂ for ENI 136₂ to update its local separately-maintained whitelist (not shown). After step 222, method 200 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of dynamically reprogramming network infrastructure, the method comprising:
   providing a virtual machine (VM) on a first host;
   migrating the VM from the first host to a second host;
   connecting the VM to a second hypervisor on the second host, and associating the VM with a second elastic network interface (ENI) of the second host;
   responsive to the connecting, extracting an identifier of the VM and an identifier of the second ENI;
   transmitting the identifier of the VM and the identifier of the second ENI to a controller; and
   adding, by the controller, the identifier of the VM to a second list associated with the second ENI.

2. The method of claim 1, further comprising:
   receiving, by the second ENI, a network packet;
   comparing, by the second ENI, the destination address of the packet to the second list; and
   responsive to the comparing:
      blocking the packet, by the second ENI, if the destination address is not on the second list;
      transmitting the packet toward the destination address, by the second ENI, if the destination address is on the second list.

3. The method of claim 1, further comprising:
   receiving, by the second ENI, a network packet;
   comparing, by the second ENI, the source address of the packet to the second list; and
   responsive to the comparing:
      blocking the packet, by the second ENI, if the source address is not on the second list;
      transmitting the packet toward a destination address of the packet, by the second ENI, if the source address is on the second list.

4. The method of claim 1, wherein the extracting and the transmitting are performed by a second daemon within the second hypervisor, the second daemon configured to monitor port-connect events between virtual machines and the second hypervisor.

5. The method of claim 1, wherein the adding the identifier of the VM to the second list associated with the second ENI comprises adding the IP address of the VM to a master list maintained by the controller, the master list containing all white lists of all ENIs of the computer system.

6. The method of claim 1, wherein the adding the identifier of the VM to the second list associated with the second ENI comprises adding the IP address of the VM to a local list maintained by the second ENI.

7. The method of claim 1, wherein the adding the identifier of the VM to the second list associated with the second ENI comprises removing the identifier of the VM from a first list associated with a first ENI of the first host.

8. The method of claim 1, wherein the connecting comprises associating the VM to a port of the second hypervisor, and associating the port to the second ENI.

9. The method of claim 1, wherein the identifier of the VM is an IP address of the VM, and wherein the identifier of the second ENI is an IP address of the second ENI.

10. The method of claim 1, wherein the providing the VM on the first host comprises:
providing the first host, the first host including a first hypervisor that has a first port, the VM being connected to the hypervisor through the first port, the first host further including a first ENI, the first ENI having a first list, and the first list containing an identifier of the VM; and
providing a first daemon with the first hypervisor, the first daemon configured to monitor port-connect events between virtual machines and the first hypervisor.

11. A non-transitory computer readable medium comprising instructions to be executed in a processor of a computer system, the instructions when executed in the processor cause the computer system to carry out a method of dynamically reprogramming network infrastructure, the method comprising:
providing a virtual machine (VM) on a first host;
migrating the VM from the first host to a second host;
connecting the VM to a second hypervisor on the second host, and associating the VM with a second elastic network interface (ENI) of the second host;
responsive to the connecting, extracting an identifier of the VM and an identifier of the second ENI;
transmitting the identifier of the VM and the identifier of the second ENI to a controller; and
adding, by the controller, the identifier of the VM to a second list associated with the second ENI.

12. The non-transitory computer readable medium of claim 11, further comprising:
receiving, by the second ENI, a network packet;
comparing, by the second ENI, the destination address of the packet to the second list; and
responsive to the comparing:
blocking the packet, by the second ENI, if the destination address is not on the second list;
transmitting the packet toward the destination address, by the second ENI, if the destination address is on the second list.

13. The method of claim 11, further comprising:
receiving, by the second ENI, a network packet;
comparing, by the second ENI, the source address of the packet to the second list; and
responsive to the comparing:
blocking the packet, by the second ENI, if the source address is not on the second list;
transmitting the packet toward a destination address of the packet, by the second ENI, if the source address is on the second list.

14. The non-transitory computer readable medium of claim 11, wherein the extracting and the transmitting are performed by a second daemon within the second hypervisor, the second daemon configured to monitor port-connect events between virtual machines and the second hypervisor.

15. The non-transitory computer readable medium of claim 11, wherein the adding the identifier of the VM to the second list associated with the second ENI comprises adding the IP address of the VM to a master list maintained by the controller, the master list containing all white lists of all ENIs of the computer system.

16. The non-transitory computer readable medium of claim 11, wherein the adding the identifier of the VM to the second list associated with the second ENI comprises adding the IP address of the VM to a local list maintained by the second ENI.

17. The non-transitory computer readable medium of claim 11, wherein the adding the identifier of the VM to the second list associated with the second ENI comprises removing the identifier of the VM from a first list associated with a first ENI of the first host.

18. The non-transitory computer readable medium of claim 11, wherein the connecting comprises associating the VM to a port of the second hypervisor, and associating the port to the second ENI.

19. The non-transitory computer readable medium of claim 11, wherein the providing the VM on the first host comprises:
providing the first host, the first host including a first hypervisor that has a first port, the VM being connected to the hypervisor through the first port, the first host further including a first ENI, the first ENI having a first list, and the first list containing an identifier of the VM; and
providing a first daemon with the first hypervisor, the first daemon configured to monitor port-connect events between virtual machines and the first hypervisor.

20. A computer system comprising:
a first host comprising a virtual machine (VM)
a second host comprising a second hypervisor and a second elastic network interface (ENI);
a controller; and
a processor, wherein the processor is programmed to carry out a method of dynamically reprogramming network infrastructure, the method comprising:
migrating the VM from the first host to the second host;
connecting the VM to the second hypervisor on the second host, and associating the VM with the ENI of the second host;
responsive to the connecting, extracting an identifier of the VM and an identifier of the second ENI;
transmitting the identifier of the VM and the identifier of the second ENI to the controller; and
adding, by the controller, the identifier of the VM to a second list associated with the second ENI.

* * * * *